(12) United States Patent
Lingemann

(10) Patent No.: US 11,346,420 B2
(45) Date of Patent: May 31, 2022

(54) ENERGY ABSORPTION DEVICE FOR VEHICLE STEERING COLUMN AND VEHICLE STEERING COLUMN

(71) Applicant: TRW Automotive GmbH, Alfdorf (DE)

(72) Inventor: Markus Lingemann, Bochum (DE)

(73) Assignee: ZF Automotive Germany GmbH, Alfdorf (DE)

( * ) Notice: Subject to any disclaimer, the term of this patent is extended or adjusted under 35 U.S.C. 154(b) by 401 days.

(21) Appl. No.: 16/666,541

(22) Filed: Oct. 29, 2019

(65) Prior Publication Data
US 2020/0149606 A1 May 14, 2020

(30) Foreign Application Priority Data
Nov. 9, 2018 (DE) .......................... 102018128122.6

(51) Int. Cl.
*B62D 1/19* (2006.01)
*F16F 7/12* (2006.01)
*B62D 1/189* (2006.01)

(52) U.S. Cl.
CPC .............. *F16F 7/123* (2013.01); *B62D 1/189* (2013.01); *B62D 1/192* (2013.01); *F16F 7/128* (2013.01); *F16F 2230/18* (2013.01)

(58) Field of Classification Search
CPC ..... F16F 7/123; F16F 7/128; F16F 7/12; F16F 2230/18; B62D 1/19; B62D 1/192; B62D 1/195; B62D 1/197; B62D 1/189
USPC .......................................................... 280/777
See application file for complete search history.

(56) References Cited

U.S. PATENT DOCUMENTS 5,799,760 A * 9/1998 Small ..................... A62B 35/04
267/155
2015/0217151 A1* 8/2015 Jones ..................... A62B 35/04
182/234

FOREIGN PATENT DOCUMENTS

| CN | 205044808 U | * | 2/2016 |
| DE | 19725163 C2 | | 4/2002 |
| DE | 60006815 T2 | | 5/2004 |

* cited by examiner

*Primary Examiner* — Keith J Frisby
(74) *Attorney, Agent, or Firm* — Robert James Harwood

(57) ABSTRACT

An energy absorption device for a vehicle steering column comprising a metal band and an adjustable deformation unit through which the metal band extends. The deformation unit is a rotatable hollow roller having a first contact surface inside the hollow roller that is separated from an outer contact surface by an outlet slot. The metal band passes through an inlet slot into the interior of the roller, and then through the outlet slot leaves the roller, in a manner that that said metal band is entirely deformed along an S-shaped curve.

12 Claims, 3 Drawing Sheets

ENERGY ABSORPTION DEVICE FOR VEHICLE STEERING COLUMN AND VEHICLE STEERING COLUMN

CROSS-REFERENCE TO RELATED APPLICATION

This application claims priority to German Patent Application No. 102018128122.6, filed Nov. 9, 2018, the disclosure of which is incorporated herein by reference in its entirety.

TECHNICAL FIELD

The present disclosure relates to an energy absorption device for a vehicle steering column and a vehicle steering column comprising said energy absorption device.

BACKGROUND

Vehicle steering columns have several characteristics. On the one hand, they must, except for cheaper cars, allow adjustment of the steering shaft in the axial and/or tilt direction, and on the other hand, they must absorb energy in the event of an accident. This energy absorption is possible due to an individual energy absorption device, which acts between two parts of the steering column moving relatively toward each other in the event of a crash. These parts are usually an outer tube and an inner tube extending into the outer tube, said inner tube receiving the steering shaft.

In the prior art such an energy absorption device, is provided by a metal band and an adjustable deformation unit, through which the metal band passes along a curved deformation section, and while absorbing energy it is moved through and along the deformation section, for said metal band to be plastically deformed. Consequently, this deformation provides the energy absorption.

From DE 600 06 815 T2 a generic energy absorption device is known, wherein two deflectors sit on a lever that can be pivoted. A deflector is attached concentrically to the pivot axis and the other is attached to the end of the lever. A metal band extends around the first deflecting element, obliquely backwards, then around the other deflecting element, to finally extend again in the opposite direction. By pivoting the lever, the wrap angle of the metal band can be varied on each deflecting element. Thus, the degree of deformation can be varied.

SUMMARY

The object of the present disclosure is to provide a deformation device for a steering column as well as a steering column, wherein the deformation unit is compactly constructed, and a high change of the amount of absorbed forces and energies by the deformation unit is possible due to high degree of adjustability. The energy absorption unit according to the present disclosure comprises a metal band and an adjustable deformation unit, through which the metal band passes along a curved deformation section, and while absorbing energy it is moved through said section, for said metal band to be plastically deformed. The deformation unit comprises a hollow roller rotatable around a central axis, wherein for the metal band to make contact, the deformation unit has a first convex contact surface located in the inner side of the roller in its interior, and a second contact surface located on the outer side of the roller, wherein the first and the second contact surface are each convex and curved in the opposite direction to form an S-shape, wherein the roller has an outlet slot for the metal band to pass through, and by said metal band the first and the second contact surface are separated from each other, and also an inlet slot positioned away from the outlet slot through which the metal band passes into the interior of the roller, to be supported against the first contact surface.

In the energy absorption device according to the present disclosure, the plastically deformable metal band passes through a deformation roller unit. Convex curved deformation surfaces are not only available on the outer face, but also in the hollow interior of the roller. For that reason, a very compact construction or assembly is possible. In addition, the roller is relatively stable in itself and can absorb high forces. The terms inlet slot and outlet slot are in no way limited to the effect that the metal band would be determined by the movement direction or the insertion direction. In fact, the different terms allow to identify them more easily.

Due to the rotability of the roller, the wrap angle of the metal band around both contact surfaces can be changed, as an option continuously, to adjust the required energy absorption amount. If a high energy absorption level is achieved, the roller is actively rotated by a drive in a manner that the wrap angle is large at both contact surfaces. If a low energy absorption level is achieved, the roller is actively rotated in the opposite direction and provides a smaller wrap angle for the metal band.

An embodiment of the invention provides that the energy absorption level is adjustable in stages. In the initial position, the roller is locked in a position in which a high energy absorption level is guaranteed. The locking takes place, for example, via a movable or destructible pin or, in other words, via a releasable pin. For example, it is provided a pyrotechnic device that adjusts or destroys the pin in a manner that said pin when detecting the state "belted" or "unbelted" or light person releases the movement of the roller. The roller can rotate freely and then will move into the position in which it opposes the least resistance, in a manner that it is possible to switch between two energy absorption levels.

An option of the invention also provides that one end of the metal band is fastened to the moving part while the opposite end is freely movable. The free end then moves toward the roller when the moving part of the vehicle steering column moves forward in the event of a crash.

The first and second contact surfaces should have a continuous curvature, which means surfaces without recesses or creases, against which the metal band is supported in each rotational position of the roller.

For ease of manufacturing, the first and the second contact surface preferably have the same curvature, that is, the curvatures are projected in opposite directions, but have the same dimensions. The outlet slot is located preferably in the region of the rotation axis, so that relatively small lever lengths are present in the event of a crash. Also, a movement under load is improved in this case. Preferably, the inlet slot should extend over a circumferential angle that corresponds at least to a rotational angle region of the roller. This is to prevent that the metal band may be supported against the edge of the slot on the roller especially if the roller rotates at specific angles.

The course of the metal band in the energy absorption device is determined in a manner that regardless of the rotational position of the roller, the metal band always extends tangentially to the two contact surfaces. This means that the part of the metal band that leads to the first contact surface, seen in axial view of the roller, forms a tangent to the first contact surface, as well as the part of the metal band that leads to the second contact surface. This part also extends tangentially to its associated surface, in this case, the second contact surface.

The roller is preferably a sheet metal bending part. The peripheral wall of this bent sheet metal part forming the first and the second contact surface may be a one-piece sheet section. The sheet metal bending part has a sheet metal strip, which forms the first and second contact surface and whose opposite ends are secured together, for example by flanging. In an axial view of the roller, this means a closed circumferential curve. Because of this, the stability of the roller is increased. The sheet metal strip may extend along a convex arched shape from the end of the second contact surface away from the outlet slot, toward the inlet slot until reaching its fastening end, to form a half-roller having a semi-circular shape. Thus, the sheet metal strip forms a half-roller spaced from the contact surfaces. From the inlet slot the sheet metal strip can also extend over the first contact surface until reaching the fastening end. In a preferred embodiment, it is designed in a manner that the two end portions of the sheet metal strip with respect to the fastening end form a double layer and lie on top of each other. This increases stability.

The first and second contact surfaces can be inscribed, seen in an axial view of the roller, to a circle enclosing the roller around the rotation axis Each contact surface Is located diagonally to each other in an associated quadrant with respect to the rotation axis of the roller. This increases the symmetry of the deformation element and the symmetry of force applications, A rotational position of the roller in which minimal or no deformation energy is generated, provides that the roller will allow the metal band to pass through with a wrap angle of less than 15 degrees. This 15 degree wrap is present in the region of the outlet slot.

The energy absorption device of the present disclosure may additionally have a deflector positioned away from the roller, with the metal band passing around said deflector. In particular, the metal band in this case extends constantly with a wrap angle of 180 degrees around the deflector.

The present disclosure also provides a vehicle steering column comprising an energy absorption device according to the present disclosure, which is characterized by an outer tube and an inner tube extending into the outer tube, with the steering shaft being inserted into the inner tube. The ends of the metal bands are attached, on the one hand, to the outer tube and, on the other, to the inner tube, wherein the outer and the inner tube in the event of a crash, are displaceable relative to each other. Due to this relative displacement, the metal band moves through the deformation unit, and also along the deflector, if present. The movement of the metal band and the deformation unit can be seen relative to each other. This means that the metal band must not necessarily be moved relative to the stationary deformation unit; reversely, the deformation unit can also be moved along the metal band. The deformation unit is preferably attached to either one of the two tubes or to another part of the vehicle.

BRIEF DESCRIPTION OF THE DRAWINGS

Further advantages and features of the present disclosure will become apparent from the following description and the accompanying drawings, to which reference is made. In which are shown.

DETAILED DESCRIPTION

Figure 1:
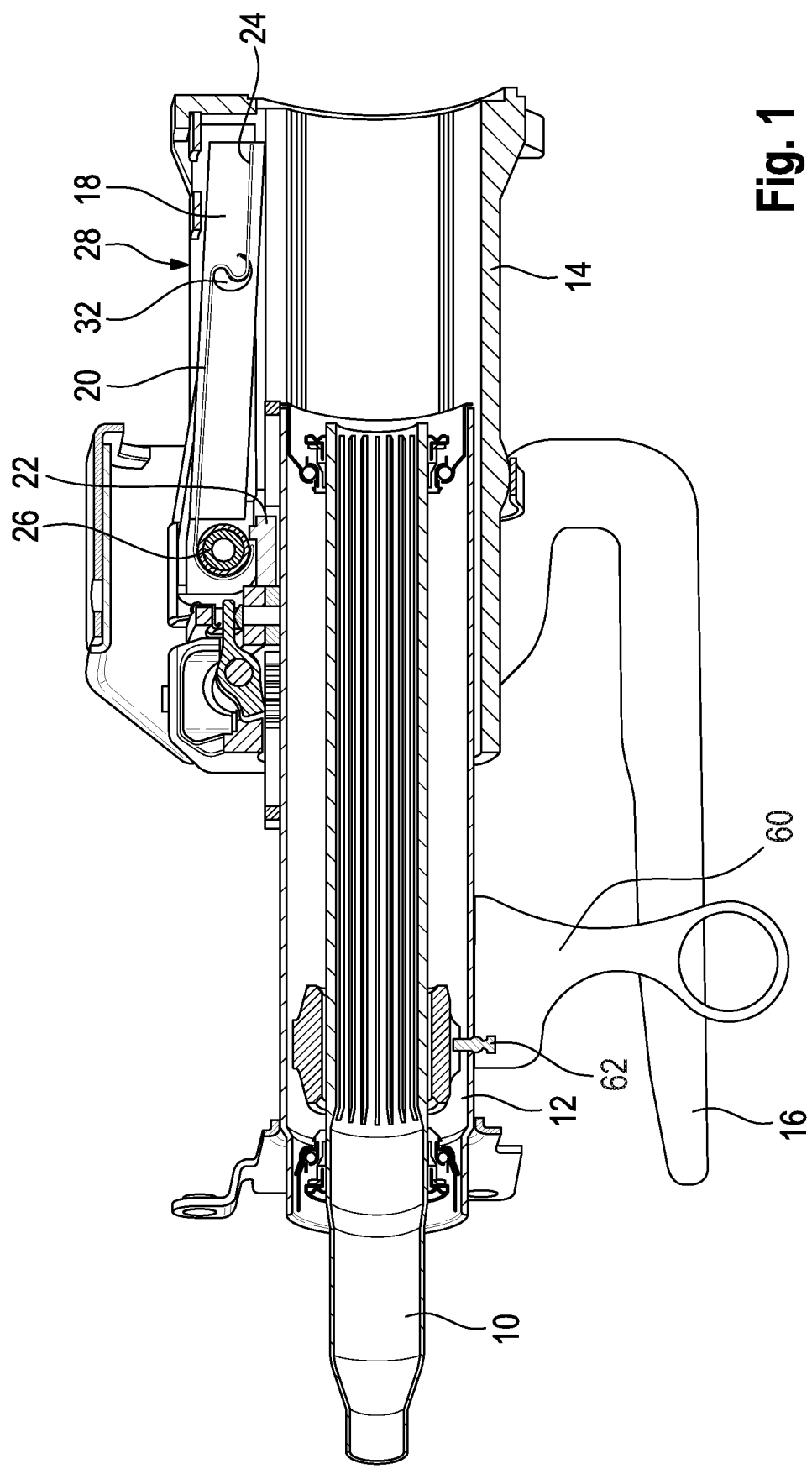
FIG. 1 a longitudinal sectional view through an embodiment of a steering column according to the present disclosure, with an integrated energy absorption device according to the present disclosure.

In FIG. 1, a longitudinal section is shown through a vehicle steering column comprising a steering shaft 10, which extends into a so-called inner tube 12, which runs into an outer tube 14. A locking lever 16 either clamps the movable parts of the two tubes 12, 14 or releases them to allow adjustment of the steering column in the axial direction (see arrow) and/or in the pivoting direction. Between the tube 12, 14 an energy absorption device 18 is provided, which is shown in FIG. 1 schematically.

The energy absorption device 18 comprises a metal band 20 that passes through barriers which operate as deformation section and, accordingly, is deformed in the event of a crash in order to absorb energy. One end 22 of the metal band 20 is, for example, attached to the inner tube 12 and the opposite end 24 is free, that is, is not attached to any part. From the end 22 the metal band 20 extends around a roller-shaped deflector 26, which can be fixedly or rotatably mounted. In the following case, the deflector 26 is a circular cylinder. After rotating about 180 degrees around the deflector 26, the metal band 20 extends further into a deformation unit 28 and passes partially through this deformation unit 28. Both the deformation unit 28 and the deflector 26 are, for example, fastened to the outer tube 14 or coupled to it. Alternatively, they can also be fixedly attached to the vehicle.

Figure 2:
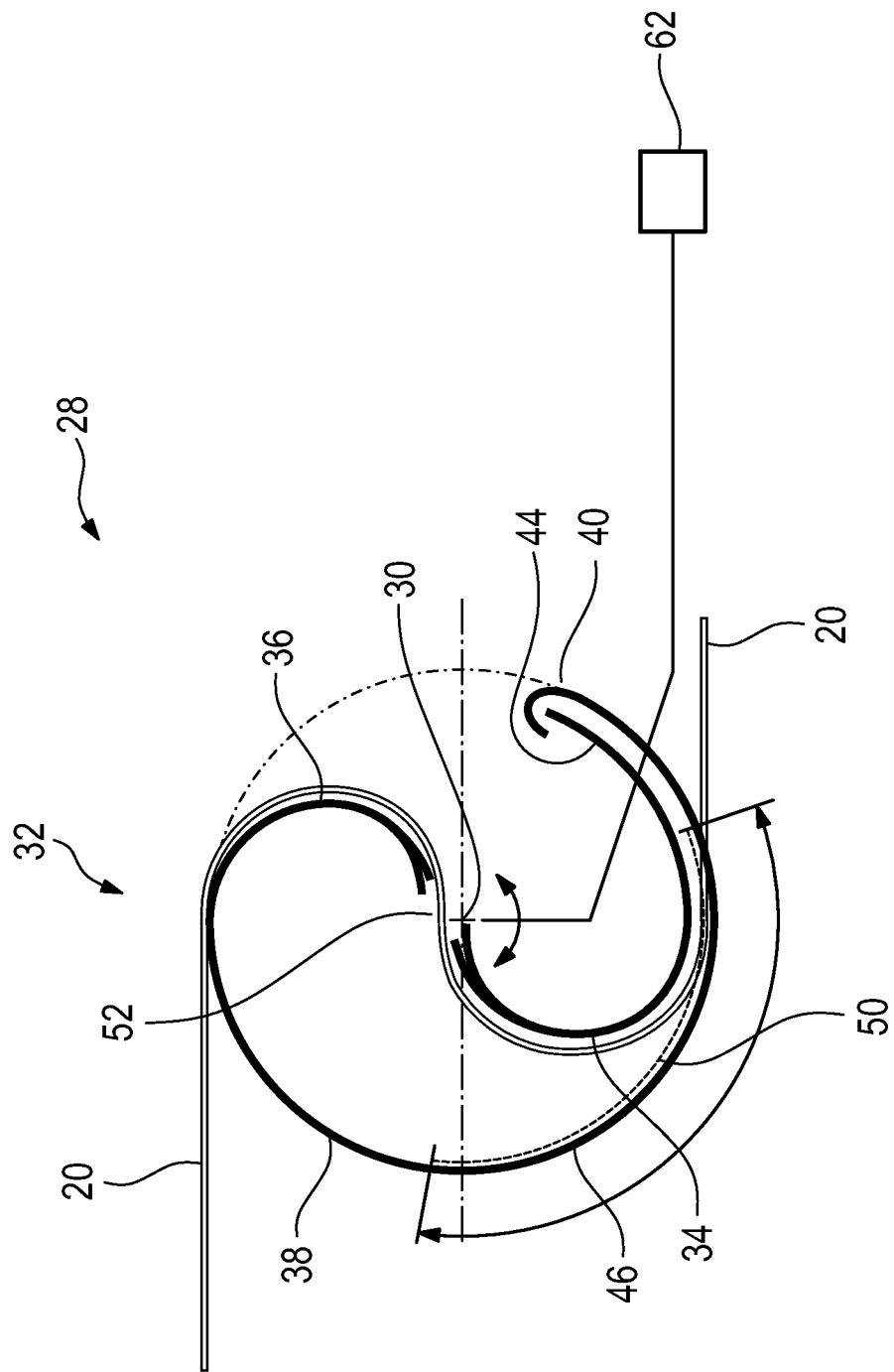
FIG. 2 shows a radial section through a deformation unit of the energy absorption device according to the present disclosure.

In FIG. 2, the deformation unit 28 is shown in an axial or radial sectional view. The deformation unit 28 comprises an actively rotatable roller 32 around a central axis 30, in particular of cylindrical shape. This roller 32 is hollow. The roller 32 has different sections with different functions along its outer circumference. There are provided two contact surfaces for the metal band 20, each defined by a convex shape, that is, a first contact surface 34 located in the interior of the hollow roller 32 and a second contact surface 36 located on the outer face of the roller 32. The contact surface 34 is referred to as the first contact surface and the contact surface 36 as the second contact surface. Both contact surfaces 34, 36 are combined to form an S-shape, wherein an "S-shape" should also include a mirrored 5, as shown in FIG. 2. Both the first and the second contact surface 34, 36 have continuous curvatures, here preferably, they are even defined by a singular bending radius, which must not necessarily be the case, though. In particular, the curvatures of the two contact surfaces 34, 36 are the same, only in opposite directions, "Opposite direction" with respect to the curvatures of the contact surfaces 34, 36 means that, based on FIG. 2, the contact surface 36 is projected to the right, while the contact surface 34 is projected to the left, i.e. in the opposite direction.

The deformation unit 28 is in particular a sheet metal bending part, in which the outer circumference, i.e. the surface area is formed by a sheet metal strip, in particular by a continuous sheet metal strip 38. The two opposite ends of the sheet metal strip 38 form a common fastening end 40, to which the ends are fastened to each other, in particular as shown in FIG. 2 by flanging one end around the other end. The sheet metal strip 38 extends from the first contact surface 34 toward the second contact surface 36 along a convex arc 44 until reaching the fastening end 40. The arc 44 continues toward the first contact surface 34.

The other end of the elongated sheet metal strip 38, shown in the embodiment, which is not limiting, is flanged over the opposite end of the sheet metal strip, and extends in an arc along and spaced from the first contact surface 34 until reaching the second contact surface 36, which is seamlessly connected to said first contact surface 34. This portion of the sheet metal strip 38 is referred to as the half-roller 46. As can be seen in FIG. 2, this half-roller 46 extends not only over 180°, but over more than 180°. The half-roller 46 has a curvature with a singular radius, that is, said curvature defines a portion of a circular cylinder.

In FIG. 2, the entire circle is completed with a section (between 12 and 4 o'clock) identified with dotted lines. By dividing this circle into four uniform segments, seen in axial view, it is seen that the first contact surface 34 and the second contact surface 36 are in diametrically opposite quadrants and are inscribed therein, that is, they do not extend beyond the circle itself.

Figure 3:
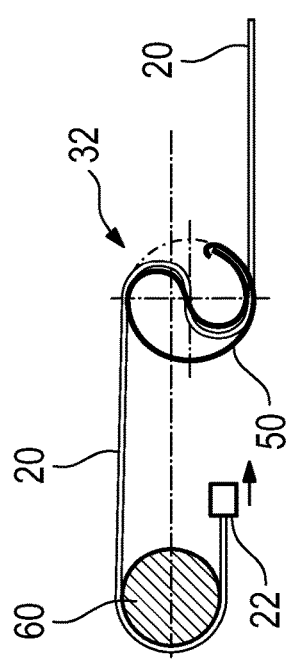
FIG. 3 shows a first position of the deformation unit as shown in FIG. 2, which provides a steadily decreasing energy absorption level.
Figure 4:
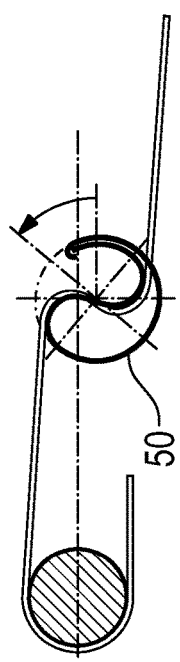
FIG. 4 shows a second position of the deformation unit as shown in FIG. 2, which provides a steadily decreasing energy absorption level.
Figure 5:
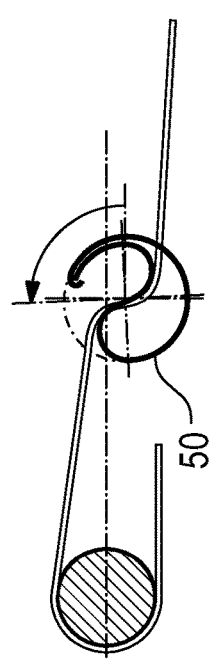
FIG. 5 shows a third position of the deformation unit as shown in FIG. 2, which provides a steadily decreasing energy absorption level.

As shown in FIGS. 2 and 3, the metal band 20 extends into the roller 32, which is possible through an inlet slot 50 provided in the half-roller 46 where the metal band 20 starts at a certain distance from the fastening end 40 and then extends further along the entire contact surface 34, that is, viewed from the central point 30, it describes a larger arc than the first contact surface 34. The inlet slot 50 is symbolized in FIG. 2 by an area of broken lines and also by an angle that shows the opening angle of the inlet slot 50 with respect to the central axis 30. The inlet slot 50 is formed by the fact that this slot is cut in the middle in the sheet metal strip 38, wherein crosspieces still remain on the side of the slot 50 and in the circumferential direction. Via the inlet slot 50 the metal band 20 passes into the interior of the roller 32, in order to be supported against the first contact surface 34, and along said surface to be bent.

In the figures, the metal band 20 is partly spaced from the contact surfaces 34, 36 shown to represent the respective surfaces and parts in a better manner. In the event of a crash, the metal band 20 of course is supported against the contact surfaces 34, 36. After the first contact surface 34, the metal band 20 extends over a slot-like outlet opening 52 in the sheet metal strip 38, said metal band 20 located in the region of the central axis 30, passing from the interior of the roller 32 outwards, in order to be supported against the second contact surface 36.

After leaving the second contact surface 36, the metal band 20 extends further towards a deflector 60, which is, for example, a circular cylindrical roller or a fixed circular cylinder. Here, the metal band 20 is deflected around at least 180°, but it is not restricted to said angle degree. The deflector 60 is an option, that is, there are also possible variants without the deflector 60. It may also be provided a rotary drive 62 (see FIG. 2), with which the roller 32 can be rotated.

Alternatively, the roller 32 may be locked in an initial position, for example via a movable or destructible pin or, in other words, via a releasable pin. In the initial position, a high resistance is set by the roller 32 in a manner that this causes a strong deformation of the metal band 20. For example, it is provided a pyrotechnic device that adjusts or destroys the pin in a manner that said pin when detecting the state "strapped" or for a light person releases the movement of the roller. The roller can rotate freely and then will move into the position in which it opposes the least resistance, in a manner that it is possible to switch between two energy absorption levels.

In the FIGS. 3 to 6 different rotational positions of the roller 32 are shown. It can be seen that in different rotational positions the contact surfaces 34, 36 have different lengths, that is, at different angular ranges said contact surfaces are contacted by the metal band 20. Accordingly, the metal band 20 is deformed more or less strongly. More deformation can achieve higher damping than less deformation.

In FIG. 3, the maximum damping is possible, that is, a high energy absorption potential. With increasing rotation, in this case counterclockwise (see FIGS. 4 to 6), the energy absorption potential decreases.

Figure 6:
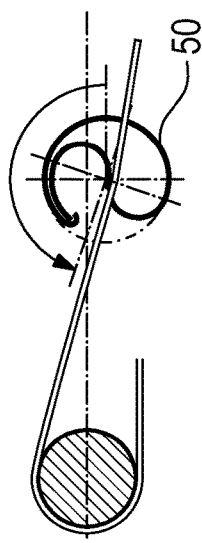
FIG. 6 shows a fourth position of the deformation unit as shown in FIG. 2, which provides a steadily decreasing energy absorption level.

In FIG. 6, the minimum position is achieved, in which the metal band 20 passes through the roller 32 only with a wrap angle of less than 15°. In this case there is no more contact between the metal band 20 and the two contact surfaces 34, 36. The metal band 20 is deflected more or less strongly only in the region of the outlet slot 52. It can also be seen that with a higher rotation of the roller 32 the angle of the respective portion of the metal band 20 is varied between the roller 32 and the deflector 60, so that with a higher rotation of the roller 32 the wrap angle on the deflecting member 60 is increased, which increases the energy absorption on or via the deflector 60.

Sensors are used to detect certain parameters that allow to determine the desired extent of energy absorption via the energy absorption device. This may include one or more of the following parameters: severity of the accident, weight of the occupant, size of the occupant, extent of the deformation, state "strapped"/"not strapped". The drive 62 is then controlled via a controller. The roller 32 is rotated accordingly to vary the degree of deformation of the metal band 20. Optionally, the drive 62 can also be omitted, so that the roller 32 can then rotate independently, for example, when a locking pin is actively destroyed.

If the steering wheel is displaced due to the impact of the occupant together with the steering shaft and the inner tube 12 relative to the outer tube 14, then the end 22 moves the metal band 20 in the direction of the arrow in FIG. 3, so that the metal band is deformed due to the formed chicanes and along the formed deformation path in the roller 32, and also due to the deflector 60, wherein in this case, friction is also playing a role, which can absorb energy.

What is claimed is:

1. An energy absorption device for a vehicle steering column comprising:
   a metal band and an adjustable deformation unit, through which the metal band extends along a curved deformation section and while absorbing energy is moved to plastically deform the metal band;
   wherein the deformation unit comprises a hollow roller rotatable around a central axis,
   wherein for the metal band to make contact, the deformation unit has a convex first contact surface located in the inner side of the roller in its interior, and a second contact surface located on the outer side of the roller,
   wherein the first and the second contact surface are each convex and curved in the opposite direction to form an S-shape, wherein the roller has an outlet slot for the metal band to pass through, and by said metal band the first and the second contact surface are separated from each other, and an inlet slot positioned away from the outlet slot through which the metal band passes into the interior of the roller, to be supported against the first contact surface.

2. The energy absorption device according to claim 1, wherein the first and second contact surfaces have continuous curvatures.

3. The energy absorption device according to claim 1, wherein the first and second contact surfaces have the same curvature.

4. The energy absorption device according to claim 1, wherein the outlet slot is located in the region of the central axis.

5. The energy absorption device according to claim 1, wherein the inlet slot extends over a circumferential angle that corresponds at least to a rotational angle region of the roller.

6. The energy absorption device according to claim 1, wherein the roller is a sheet metal bending part.

7. The energy absorbing device according to claim 6, wherein the sheet metal bending part has a sheet metal strip which forms the first and second contact surfaces and the opposite ends are fastened to each other.

8. The energy absorption device according to claim 7, wherein the sheet metal strip extends along a convex arched shape from the end of the second contact surface away from the outlet slot toward the inlet slot until reaching its fastening end to form a half-roller.

9. The energy absorption device according to claim 8, wherein the sheet metal strip extends further in a convex manner from the end of the first contact surface away from the inlet slot until reaching the fastening end.

10. The energy absorption device according to claim 8, wherein the first and the second contact surface are inscribed, seen in the axial view of the roller, to a circle enclosing the roller around the central axis, and the first contact surface is located in a quadrant and the second contact surface is located in a diagonal to the quadrant.

11. The energy absorption device according to claim 1, wherein a rotational position of the roller allows the metal band to pass through the roller with a wrap angle of less than 15°.

12. The energy absorption device according to claim 1, wherein an additional deflector positioned away from the roller is provided for the metal band, which passes around said deflector.

* * * * *